No. 676,369. Patented June 11, 1901.
H. E. REXROAD.
SELF MEASURING RIBBON AND LACE CABINET.
(Application filed Oct. 29, 1900.)
(No Model.) 4 Sheets—Sheet 1.
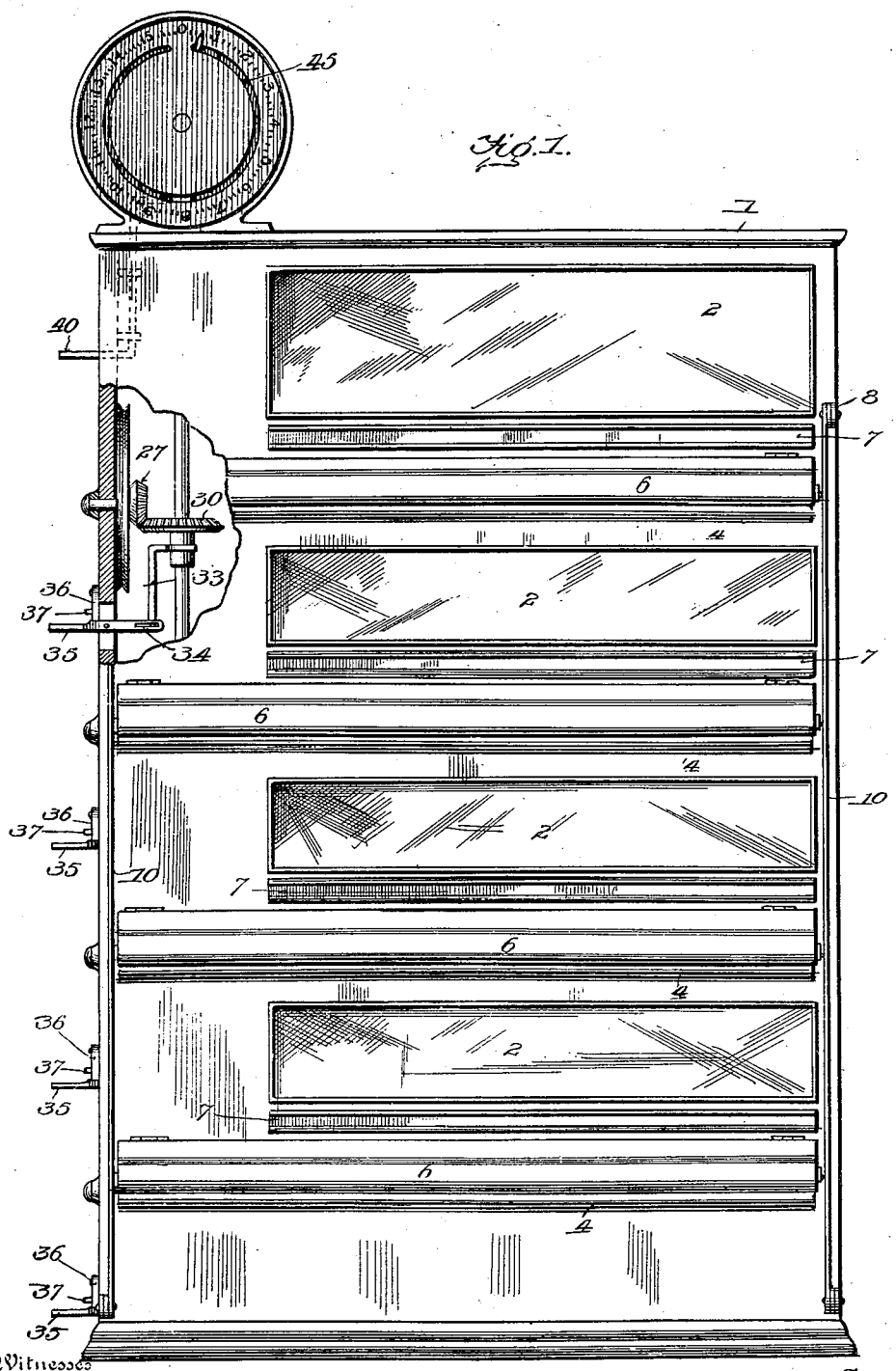

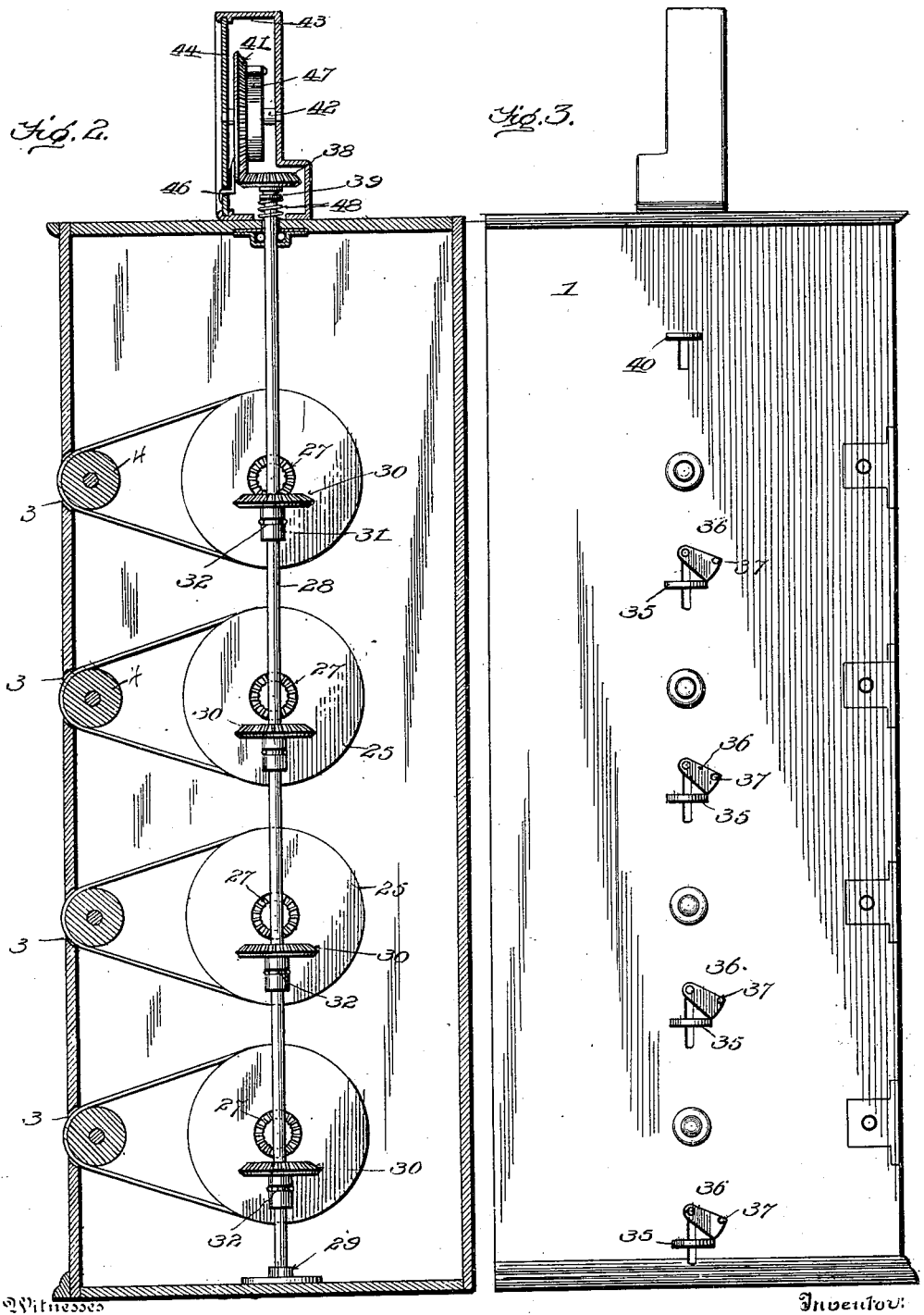

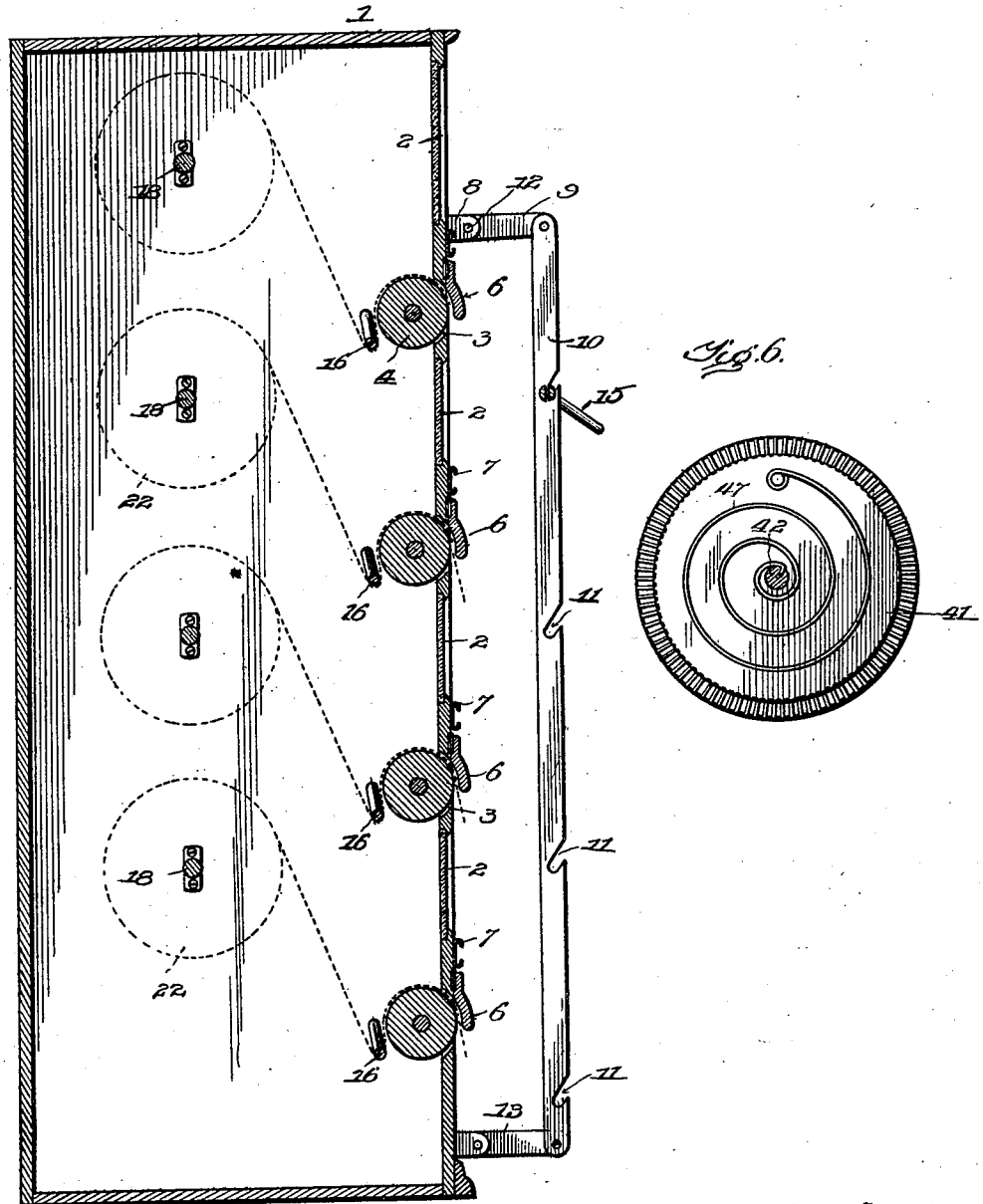

No. 676,369. Patented June 11, 1901.
H. E. REXROAD.
SELF MEASURING RIBBON AND LACE CABINET.
(Application filed Oct. 29, 1900.)
(No Model.) 4 Sheets—Sheet 4.

Inventor:
H. E. Rexroad,
Witnesses
Harry S. Rohrer,
Hubert D. Linson By Victor J. Evans. Attorney

UNITED STATES PATENT OFFICE.

HENRY E. REXROAD, OF THOMAS, WEST VIRGINIA, ASSIGNOR OF ONE-FOURTH TO CHARLES C. WENTZ AND RICHARD H. RUTHERFORD, OF PARKERSBURG, WEST VIRGINIA.

SELF-MEASURING RIBBON AND LACE CABINET.

SPECIFICATION forming part of Letters Patent No. 676,369, dated June 11, 1901.

Application filed October 29, 1900. Serial No. 34,827. (No model.)

*To all whom it may concern:*

Be it known that I, HENRY E. REXROAD, a citizen of the United States, residing at Thomas, in the county of Tucker and State of West Virginia, have invented new and useful Improvements in Self-Measuring Ribbon and Lace Cabinets, of which the following is a specification.

This invention relates to new and useful improvements in cabinets for displaying and dispensing ribbons, laces, &c., and for indicating the amount removed therefrom. Its primary object is to provide a device of simple construction within which rolls of material may be readily placed and detachably secured. These rolls are adapted to revolve when the ribbon or other material thereon is withdrawn from the cabinet, and such revolution of the rolls is adapted to impart motion to an indicator which is suitably disposed and which is adapted to record the amount of material removed.

A further object is to provide means of novel construction whereby motion may be imparted from any one or more of the rolls to the indicating mechanism and said rolls held in such position.

Another object is to provide means whereby the indicating mechanism may be promptly returned to its original position after each length of material has been removed.

Another object is to construct a rack of peculiar construction which is adapted to support a rod having a crank or other means thereon, whereby the same may be readily revolved. This rod is adapted to engage the ribbon, lace, &c., and wind the same thereon when it is being removed from the cabinet.

With these and other objects in view the invention consists in the novel construction and combination of parts, which will be hereinafter fully described and claimed, and illustrated in the accompanying drawings, showing the preferred form of my invention, and in which—

Figure 5:
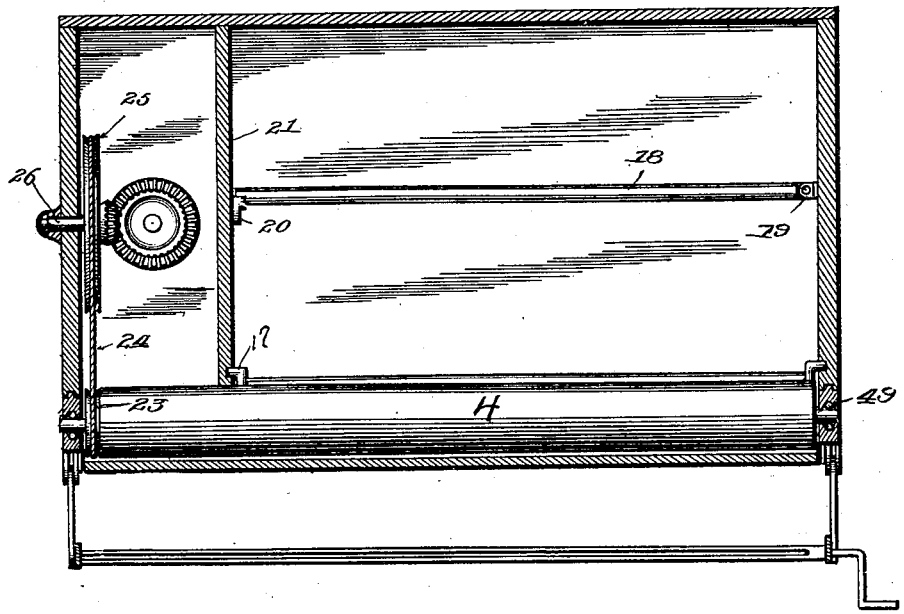
Figure 7:
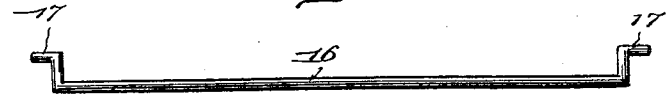
Figure 8:
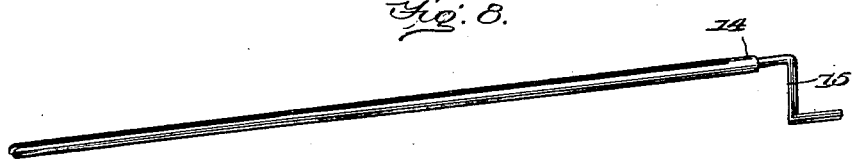

Figure 1 is a front elevation of the cabinet, showing a portion of the same broken away to illustrate a portion of the indicator mechanism. Fig. 2 is a vertical section through the cabinet, showing the indicator and the operating mechanism thereof in elevation. Fig. 3 is a side elevation of the cabinet. Fig. 4 is a central vertical section through said cabinet. Fig. 5 is a horizontal section. Fig. 6 is a detail view of the spring-controlled gear of the indicator. Fig. 7 is a detail view of the guide-rod. Fig. 8 is a similar view of the rod employed for winding the material.

Referring to the drawings by numerals of reference, 1 is a cabinet formed of any suitable material and having lights of glass or other transparent material 2 arranged in the face thereof at suitable intervals. Transversely-extending slots 3 are formed within the front of the cabinet at points between the sheets of glass, and rollers 4 are journaled within the sides of the cabinet and are adapted to extend into said slots. Strips 6 are hinged to the front face of the casing and are adapted to extend downward and partly inclose that portion of each roller which is exposed through its slot 3. These strips are so mounted as to bear upon the ribbon or other material which may be mounted upon the rollers. Card-holders 7 are preferably arranged upon the front face of the cabinet at points above the hinged strips 6, and within these holders may be placed cards bearing suitable reading matter—as, for instance, the name of the material dispensed from the roller adjacent thereto, the price, &c. Ears 8 extend forward from the front face of the cabinet at each side of the top and bottom, respectively, and links 9 are pivoted thereto and to vertical strips 10, having inclined recesses or slots 11 therein. It is obvious that when these slotted strips 10 are swung upward into and past vertical alinement with the pivots 12 of the links 9 they will be held in raised position and will bear upon the front face of the cabinet. Suitable means, as stops 13, are provided for limiting the downward movement of the slotted strips 10. A forked or split rod 14 (shown in Fig. 8) is adapted to be fitted in any two of the recesses 11, and a crank 15 is provided at one end thereof, whereby the same may be readily revolved. A rod 16, having a crank 17 at each end thereof, is mounted in rear of each of the rollers 4, said cranks being journaled within the sides of the cabinet at points in horizontal alinement with the bearings of the rollers 4. It will thus be seen that the main portion of each of the rods 16 will be held suspended at a point substantially in horizontal alinement with the lower edge of each roller 4.

Rods 18 are pivoted within ears 19, secured upon the inner face of one side of the cabinet, and these rods are arranged at points above each of the rollers 4, before referred to, but in rear thereof. Brackets 20 are secured upon a partition 21, extending vertically within the cabinet, and are for the purpose of supporting these rods when the same are in the position shown in Fig. 5. Spools 22 (shown in dotted lines in Fig. 4) are wound with ribbon and are then placed upon the rods 18, before referred to. The ribbon of each roll is then brought downward under the rod 16 in rear of the adjacent roller 4 and thence over said roller and under the strip 6 and out through the slot 3. Each of the rollers 4 is provided with an annular groove 23 at one end, and within this groove is mounted a cord or belt 24, which passes over a grooved disk 25, mounted upon a shaft 26, which is journaled within one of the sides of the cabinet. One of these disks 25 is provided for each roller 4. A bevel-gear 27 is secured to the center of the inner face of each disk and is for a purpose hereinafter more fully described. A vertical shaft 28 is arranged within the cabinet, the lower end thereof being journaled within a socket 29 upon the bottom of the cabinet, while the upper end passes through the top of said cabinet. Bevel-pinions 30, which are equal in number to the disks 25, are feathered upon this shaft 28, and each is provided with a sleeve 31, having an annular groove 32 therein, within which is fitted the forked end of a link 33. The lower end of this link is fitted within a slot 34, formed within a lever 35, which is pivoted within a side of the casing. It will thus be seen that when the outer end of the lever is depressed the link will be forced upward, throwing its bevel-pinion 30 into mesh with the adjacent bevel-pinion 27. Suitable means may be provided for locking the gears in mesh. In Fig. 3 I have shown dogs 36, which are pivoted to the side of the casing at points above the levers 35, and these dogs are adapted when the levers are depressed to swing downward and prevent upward movement thereof. When it is desired to release a lever, so as to disengage the gears, it is merely necessary to grasp the stud or handle 37 upon the dog and swing the same laterally out of the path of the lever. A lever 35 and a link 33 are provided for each of the bevel-pinions 30.

A bevel-pinion 38 is feathered upon the upper end of the shaft 28 and is also provided with a grooved sleeve 39, the groove of which receives the forked end of a lever 40, extending through the side of the casing. This bevel-gear 38 is adapted to engage a bevel-pinion 41, which is loosely mounted upon a fixed shaft 42, journaled within a casing 43, which is mounted upon the top of the cabinet. The front 44 of this casing is preferably provided with a circular slot 45, about which are arranged suitable graduations, as shown in Fig. 1. An indicator or pointer 46 is secured to the gear 41 and extends through the slot 45, and this pointer is normally held at "0" by a spring 47, the opposite ends of which are secured to the gear 41 and to the shaft 42, respectively. The pinion 38 is held normally in engagement with the gear 41 by means of a coil-spring 48, which incloses the shaft 28 and bears at opposite ends upon the sleeve 39 and the top of the cabinet, respectively. It will be seen, however, that when the lever 40 is pulled downward the spring 48 will be compressed and the gear 38 will be removed from mesh with the gear 41.

It will be seen that the rollers 4 are provided with ball-bearings 49, (see Fig. 5,) so that the parts may operate with the minimum amount of friction.

After the ribbon or other material has been placed within the cabinet, as hereinbefore described, the same will be visible through the glass 2 before referred to.

When it is desired to remove a desired quantity from one of the spools, the lever 35, which operates the pinion which is adapted to receive motion from the roller 4 belonging to said spool, is depressed, and the dog 36 will promptly fall into position and lock the same. The material is then drawn outward and placed within the forked rod 14, and after said rod has been seated within the desired recesses 11 the same is turned by means of the crank 15. The material will thus be drawn over the roller 4, and as the same is held firmly clamped upon said roller by the rod 16 and the hinged strip 6 it will cause the roller to revolve, and thereby transmit motion to its disk 25 and from said disk to the shaft 28. As the shaft revolves it will cause the pinion 41 to turn upon its shaft 42, causing the indicator 46 to travel within the slot 45 and wind the spring 47 upon said shaft. When the indicator reaches a character showing that the desired amount of material has been removed from the cabinet, the lever 40 is depressed, causing the pinion 38 to slide downward upon the shaft 28, and the pinion 41 is then free to turn back to its normal position, the same being propelled by the spring 47. As soon as the lever 40 is released the gear 38 will spring back into engagement with the pinion 41. The material may then be cut in any suitable manner, and the dog 36 is then raised out of engagement with the lever 35 and the operation may be repeated.

In the foregoing description I have embodied the preferred form of my invention; but I do not wish to be understood as limiting myself thereto, as I am aware that modifications may be made therein without departing from the principle or sacrificing any of the advantages of this invention, and I therefore reserve to myself the right to make such changes as fairly fall within the scope thereof.

Having thus described the invention, what is claimed, and desired to be secured by Letters Patent, is—

1. The combination with a cabinet having a slot in the face thereof; of a roller journaled within said cabinet and extending into the slot, a rod having cranks at the ends thereof and mounted in rear of the roller, a strip hinged to the face of the cabinet and adapted to extend over the roller within the slot, and a material-holder within the cabinet.

2. The combination with a cabinet having a slot in the face thereof; of a roller journaled within the cabinet and extending into the slot, a rod having a crank at each end thereof and mounted in rear of the roller, a strip hinged to the face of the cabinet and extending over said roller, a rod hinged within the cabinet and adapted to hold material, and means for supporting the free end of said rod.

3. The combination with a cabinet having a slot in the face thereof; of a roller journaled within said cabinet and extending into the slot, a rod having a crank at each end thereof and mounted in rear of the roller, a strip hinged to the face of the cabinet and extending over said roller, a rack hinged to the face of the cabinet and having recesses therein, a forked rod adapted to rest within said recesses and in front of the roller, a rod hinged within the cabinet and adapted to hold a roll of material, and means for supporting the free end of the rod.

4. The combination with a cabinet having a slot in the face thereof; of a roller journaled within the cabinet and extending into the slot, a rod having a crank at each end thereof and mounted in rear of said roller, a strip hinged to the face of the cabinet and extending over the roller, links pivoted to the face of the cabinet, recessed strips connecting the links, a slotted or forked rod journaled within the recesses in each strip, a crank to said rod, a rod hinged within the cabinet and adapted to hold a roll of material, and means for supporting the free end of said rod.

5. The combination with a cabinet having slots in the front face thereof; of transparent material arranged between said slots, rods hinged within the cabinet in rear of the transparent material and adapted to hold rolls of material, rollers journaled within the cabinet and adapted to extend into the slots, rods having cranks at the ends thereof and mounted in rear of the rollers, strips hinged to the face of the cabinet and partly covering the slots, a rack hinged to the front face of the casing, a slotted or forked rod journaled within the rack, and means for revolving said rod.

6. The combination with a cabinet having a slot in the face thereof; of a roller journaled within the cabinet and extending into said slot, a rod within the cabinet adapted to hold a roll of material, said material being adapted to pass over the roller and through the slot, a disk journaled within the cabinet, means for imparting motion from said roller to the disk, a gear secured to said disk, a vertical shaft, a gear feathered thereon, means for throwing said gear into mesh with the gear of the disk, and an indicator operated by said shaft.

7. The combination with a cabinet having a slot in the face thereof; of a roller journaled within the cabinet and extending into said slot, a rod within the cabinet adapted to hold a roll of material, said material being adapted to pass over the roller and through the slot, a disk journaled within the cabinet, means for imparting motion from said roller to the disk, a gear secured to said disk, a vertical shaft, a gear feathered thereon, means for throwing said gear into mesh with the gear of the disk, a casing upon the cabinet, a shaft fixed therein, a gear loosely mounted upon the shaft, a spring connecting said gear and shaft, an indicator to the gear, a gear feathered upon the vertical shaft and engaging the gear of the indicator, and means for releasing said gears from mesh.

8. The combination with a cabinet having a slot in the face thereof; of a roller journaled within the cabinet and extending into said slot, a rod within the cabinet adapted to hold a roll of material, said material being adapted to pass over the roller and through the slot, a disk journaled within the cabinet, means for imparting motion from said roller to the disk, a gear secured to said disk, a vertical shaft, a gear feathered thereon, a forked link engaging the gear upon the vertical shaft, a lever pivoted within the cabinet and adapted to raise or lower said link, thereby throwing the gear into mesh with the gear of the disk, a gear feathered upon the upper end of the vertical shaft, a spring for holding said gear normally raised, a casing upon the cabinet, a fixed shaft therein, a gear mounted upon the shaft and meshing with the gear upon the end of the vertical shaft, an indicator to said gear extending through the slot in the casing, a spring connecting said gear with the fixed shaft, and a lever engaging the gear upon the vertical shaft and adapted when depressed to compress the spring upon said shaft and disengage the gears.

9. The combination with a cabinet having a slot in the face thereof; of a roller journaled within the cabinet and extending into the slot, a rod having cranks at the ends thereof and mounted in rear of the roller, a strip hinged to the face of the cabinet and extending over the slot therein, a rod within the cabinet adapted to hold a roll of material, said material being adapted to pass under the crank-rod, over the roller and under the hinged strip, a disk journaled to the side of the cabinet, means for imparting motion from said roller to the disk, a gear secured to said disk, a vertical shaft within the cabinet, a pinion feathered thereon, a sleeve to the pinion having an annular groove, a forked link engaging said groove, a lever pivoted within the cabinet and engaging the link, a dog adapted to be seated by gravity within the path of the lever when the same is depressed, a pinion formed at the upper end of the vertical shaft, a casing inclosing said pinion, a fixed horizontal shaft within the casing, a gear loosely mounted thereon, a spring connecting said pinion with the horizontal shaft, an indicator to said pinion extending through the casing, a spring for holding the gear upon the end of the vertical shaft normally in mesh with the indicator-gear, a sleeve to said gear of the vertical shaft having an annular groove therein, and a forked lever engaging said groove and adapted when depressed to release the gear from engagement with the gear upon the fixed shaft.

In testimony whereof I affix my signature in presence of two witnesses.

HENRY E. REXROAD.

Witnesses:
C. N. McINTIRE,
G. N. McINTIRE.